2,956,046
Patented Oct. 11, 1960

2,956,046

POLYMERIZATION OF ACRYLIC ACID SALTS AND THE LIKE

Frank J. Glavis, Elkins Park, and Donald G. Downing, Upper Darby, Pa., and Henry M. Grotta, Columbus, Ohio, assignors to Rohm & Haas Company, Philadelphia, Pa., a corporation of Delaware No Drawing. Filed Sept. 21, 1954, Ser. No. 457,546

16 Claims. (Cl. 260—80.5)

This invention relates to the polymerization of certain water-soluble salts of unsaturated acid, such as sodium acrylate, and it is particularly concerned with the effecting of polymerization by means of a spray technique whereby a dry solid product is obtained directly.

It has heretofore been suggested to polymerize liquid monomers by a spray technique either in a bulk system or in a system using an organic solvent for the liquid monomer. However, the spray-polymerization of such monomers has had certain disadvantages, especially loss of monomer by volatilization and the limitation of the process to the production of polymers of relatively low molecular weight because of the shortness of time within which polymerization had to be completed. Generally a preliminary polymerization was resorted to before the spraying to assure the production of polymers of adequate molecular weight without serious loss of monomer by volatilization. However, the resort to pre-polymerized monomers gave rise to a further disadvantage in that it was difficult to spray the viscous solutions obtained from such pre-polymerizates.

Applicants have discovered that certain solid monomers can be polymerized by a spraying technique to produce a wide range of molecular weight with a high percentage of conversion. In general, the system of the present invention involves the spraying of an aqueous solution of one or more monomers with a water-soluble catalyst of the group consisting of the alkali metal and ammonium persulfates. The monomers that can be thus spray-polymerized are the water-soluble salts of acrylic acid, methacrylic acid, itaconic acid, maleamic acid, citraconic acid and aconitic acid separately or in combination and with or without other monomers, such as acrylamide, methacrylamide, maleamic acid, methyl acrylate, and ethylene glycol diacrylate.

The salts of the unsaturated monomeric acids mentioned may be the quaternary ammonium salts and amine salts thereof and also those of ammonia, the alkali metals or the alkaline earth metals. Especially important are the acrylates of ammonia, sodium, potassium, lithium, calcium, or magnesium. Preferred examples of the quaternary ammonium salts are β-hydroxyethyltrimethylammonium acrylate and benzyltrimethylammonium acrylate. Examples of the amine salts are the monomethylammonium acrylate, dimethylammonium acrylate and trimethylammonium acrylate. An aqueous solution containing a single one of these salts and the ammonium, potassium, lithium, or sodium persulfate catalyst may be polymerized by the spray technique more particularly described hereinafter to produce a homopolymer of various molecular weight with a high percentage of conversion to polymer. Alternatively, two or more of such salts may be copolymerized by the spray technique. The proportions of the comonomers may be varied widely and generally include optimum ranges wherein conversions to copolymer are higher than the conversion of either monomer to its homopolymer would be under the same operating conditions. It has also been found that when one or more of such water-soluble salts are copolymerized with one of the comonomers mentioned hereinabove, such as maleamic acid or acrylamide, higher conversions are obtainable than with the salt alone. Small amounts of comonomers which have relatively low water-solubility of about 1% to 5%, such as methyl acrylate, ethyl acrylate and N-phenyl acrylamide, may also be used in proportions in excess of their water-solubility with the aid of dispersing agents.

When the water-soluble salt is copolymerized with one or more highly water-soluble comonomers, whether another salt or not, the mixture of monomers may comprise from 5% to 95% by weight of the first-mentioned salt and 95% to 5% respectively of the other monomer or monomers. Preferably the monomer mixture comprises 25% to 75% of the first-mentioned salt and 75% to 25% respectively of the comonomer or comonomers. The monomer mixture may comprise ½ to 5% by weight of a monomer of low water-solubility.

The aqueous solution may have any concentration of the monomer but is preferably fairly concentrated or saturated. For example, the solution may contain 15% to 40% or more of the monomer or mixture of monomers. As pointed out above, a part of the monomer may be dispersed with a dispersing agent when one or more of the monomers are used in proportions exceeding the solubility thereof in the aqueous medium.

As catalyst, ammonium persulfate and the alkali metal persulfates, such as potassium or lithium persulfate, have been found to be practically unique in their ability to serve in the spray-polymerization system with these monomers and produce a wide range of molecular weights with a high percentage of conversion. The concentration of the catalyst may vary from 0.2 to 3%. The maximum conversion appears to occur in the range of about 1% to 2% of catalyst and, while an increase in the amount of catalyst above about 2% does not reduce the amount of conversion, the molecular weight is usually reduced by such an increase in catalyst concentration. When 1% to 2% of catalyst is used, the conversion with other conditions favorably adjusted may be as high as 96% to 100%.

Any mechanical equipment, which is adapted to commingle the polymer solution with a hot gaseous blast, may be used for the spray-polymerization thereof. For example, a spray gun, in which a central pipe has a discharge opening for the monomer solution within the discharge of a concentric pipe for hot air supplied under pressure, may be used for directing the dispersed solution or dispersion into the top of a tower or other collecting vessel which may be heated or supplied with heated air. Alternatively, the equipment may be of the type having a rotating disc having a feed pipe for the monomer solution or dispersion for directing such solution onto the top of the disc adjacent its center of rotation. A concentric pipe may be provided around the solution feed pipe for directing the hot gaseous blast onto the top of the disc which may be disposed horizontally within the upper region of a collecting tank or vessel. An alternative system provides two separate feed pipes for separately directing a solution of monomer in water and a solution of catalyst in water to a common mixing pipe or fitting which then feeds the mixture to the top of the disc. This latter arrangement is useful when it is desired to handle large volume solutions and the direct mixing of the monomer and catalyst in a single solution in a supply tank or reservoir would cause disadvantageous prepolymerization to a viscous condition before the entire body of the solution in the reservoir can reach the rotating disc. In general, the viscosity of the solution to be sprayed should not be over 200 centipoises and is preferably of a watery consistency or not over about 100 centipoises at the time of disruption in the spray equipment by the rotation of the disc or by the gas or air blast.

The relative rates of feed of solution and of hot gas depend upon the type of equipment, some types depending largely on the hot gas to disrupt the solution into the separate particles and other depending largely but not necessarily entirely on the high speed of rotation of the mechanical element, such as a rotating disc, for this purpose. The temperature of the gaseous blast may be from 300° F. to 900° F. This temperature depends on the particular system, the ratio of gas inlet to gas outlet temperature, and the efficiency of the heat-exchange between the gas and the droplets of the spray. Instead of heated air, the gas used may be a heated inert gas, such as nitrogen, helium, carbon dioxide, etc.

It has been found that in many cases comonomers, such as acrylamide, accelerate the rate of polymerization and thereby increase the yield and/or conversion of the unsaturated salt to the polymer. This is unexpected since spray-polymerization of acrylamide alone results in only 2% conversion to polymer under similar conditions because of volatilization. Surprisingly too, however, certain amides used in small amounts, such as up to the order of about 3.5% by weight of the total monomer, even though they are not polymerizable themselves and boil at the temperature of the heated gas, serve to accelerate the rate of polymerization. Acetamide is a representative of this type of accelerator. Surprisingly, also, the polymerization of sodium acrylate can be accelerated by the introduction in the monomer solution of a small amount, such as up to the order of about 3.5% by weight of the total monomer, of a sodium salt of partially hydrolyzed polyacrylonitrile which has been hydrolyzed to the extent of 65% to 95%.

The monomer solution may be pre-heated before introduction into the spray system, but this is unnecessary. It may be pre-polymerized to a certain extent, but this should be limited so that the solution does not exceed 200 centipoises in viscosity. This pre-polymerization, however, is entirely unnecessary to provide the large yields or conversions of the present invention. While the monomer solution may be deaerated to cut down the induction period, this has been found to provide but a very small improvement in the conversion.

As pointed out above, the temperature of the hot air or gas which disrupts or aids in disrupting the monomer solution must be at least 300° F. in temperature. Generally the conversion is increased as the temperature rises, but the molecular weight correspondingly decreased. The temperature of 550° F. to 600° F. is preferred to produce the maximum conversion, but to obtain the highest molecular weight in the polymers, temperatures of 300° to 500° may be preferred. The time available for polymerization in the spray is quite short, generally being about 1 to 2 seconds and in some cases as much as 5 seconds.

The spraying into humidified air or steam and the use of super-heated steam in place of the hot air blast are advantageous alternatives to provide the high molecular weight and percentage of conversion.

The polymers obtained are substantially dry, solid products and have numerous uses. For example, they may be introduced as thickening agents into synthetic resin dispersions, such as in aqueous dispersions of polyvinyl acetate, of polymers of acrylic acid or methacrylic acid esters, or of polymers of butadiene with acrylonitrile or styrene. Such dispersions or latices are quite commonly used as water-base paints. The polymers of the present invention may also be introduced into boilers to prevent scale deposition, into oil well drilling muds for lubricating the drill and for sealing holes in the rock formation to prevent loss of drilling mud. They also may be used as soil conditioners to improve the tilth thereof, and as flocculants to aid dewatering of aqueous suspensions by filtration, settling and decantation, etc.

In the following examples, the molecular weights of certain of the polymers are indicated relatively by the determination of the viscosity of a 5% aqueous solution thereof at 25° C. and/or by the determination of the thickening effect of 1% or 3% of such polymer in a synthetic rubber latex of a copolymer of butadiene and styrene containing 40% solids, which latex has a viscosity of 25 centipoises before the addition. The conversion to polymer is determined as follows: The dry product of the spray-polymerization is dissolved in water to produce an aqueous solution of 5% concentration. This solution is analyzed for solids content by drying a weighed sample for two hours in a forced draft oven at 150° C., and calculating the solids by the formula $$\frac{\text{Wt. of residue}}{\text{Wt. of solution}} \times 100$$

A bromine absorption number is then determined on the solution. This test for unsaturation gives the content of unpolymerized monomer. Conversion to polymer is then calculated by subtracting the amount of monomer from the amount of bone dry solids, dividing the difference by the amount of bone dry solids, and multiplying by 100 to convert the result into a percentage value.

EXAMPLE 1

To 800 grams of a 35% aqueous solution of sodium acrylate (obtained by the caustic hydrolysis of methyl acrylate), there was added 5.6 grams of ammonium persulfate (2% based on the weight of the monomer). This solution was fed aat a rate of about 62 cc. per minute through a small pipe having a split discharge to direct the solution in equal portions to each side of a vertical shaft onto the inner portion of the top surface of a rotating disc disposed horizontally and driven at about 40,000 r.p.m. by the shaft. The disc was 2 inches in diameter and was disposed horizontally and concentrically within the upper portion of a vessel having a vertical cylindrical wall about 2½ feet in diameter. A hot air blast having a temperature of 500° F. was directed to the top of the disc at a rate of about 175 to 200 cubic feet per minute. Two-hundred and seventy-five grams of product (1.6% moisture) was obtained and 64% had been converted to polymer. A 5% aqueous solution had a viscosity of 15 centipoises and 1% added to the above-mentioned synthetic rubber latex provided a viscosity of 50 centipoises.

The same procedure (except the air inlet temperature was 600° F.) was applied for the polymerization of ammonium acrylate and ammonium methacrylate respectively. The conversion in these cases was 98% and 55% respectively.

The same procedure (except that the monomer solution was fed at about 66 cc. per minute and the temperature of inlet air was 400° F.) was applied for the polymerization of lithium acrylate. The yield of product was 96% and the conversion to polymer in the product was 99%. A 5% solution in water had a viscosity of 250 c.p.s.

EXAMPLE 2

To 800 grams of 38.6% sodium acrylate solution, there was added 80 grams of a 12.5% aqueous solution of the sodium salt of a 70% hydrolyzed polyacrylonitrile. A separate solution was prepared by dissolving 5.9 grams of ammonium persulfate in 50 cc. of water. These two solutions were introduced simultaneously to a funnel whose spout fed into a short length of pipe having a split discharge on each side of the shaft of the disc described in the preceding example. The sodium acrylate solution was fed at the rate of 60 to 65 cc. per minute and the persulfate solution at the rate of 1 cc. per 17 seconds. The turbulence in the funnel mixed the two streams as they passed to the pipe with the split discharge. The air inlet temperature was 500° F. and it was supplied at about 175 to 200 cubic feet per minute. About 60% conversion to polymer was obtained and the viscosity of a 5% aqueous solution was about 30 centipoises.

EXAMPLE 3

The procedure of Example 2 was followed except that the air inlet temperautre was 550° F. A 75% conversion was obtained and a 5% aqueous solution of the polymer had a viscosity of 30 centipoises.

EXAMPLE 4

The procedure of Example 2 was followed except that the air inlet temperature was 600° F. A conversion of 80% was obtained and a 5% aqueous solution of the product had a viscosity of between 20 and 25 centipoises.

EXAMPLE 5

The two-feed technique of Example 2 was used in which a 35% aqueous solution of a mixture of 95 parts of sodium acrylate and 5 parts of calcium acrylate was fed through the funnel with an auxiliary feed of an ammonium persulfate solution to provide 2% thereof on the weight of the monomers. The hot air inlet temperature was 600° F. An 89% conversion to polymer was obtained and the product dissolved at the level of 5% in water gave a solution having a 110 centipoise viscosity. One percent of the polymer dissolved in the synthetic rubber latex above gave a viscosity of 600 centipoises.

EXAMPLE 6

The procedure of Example 5 was followed except that the proportions between sodium acrylate and calcium acrylate were changed from 75% to 25% by weight. A 90% conversion to polymer was obtained. An aqueous solution of 5% product had a viscosity of 130 centipoises and 1% of the polymer in the synthetic rubber latex imparted a viscosity of 1550 centipoises.

EXAMPLE 7

The procedure of Example 6 was followed except that the sodium acrylate and calcium acrylate mixture was replaced with a mixture of 99.5 parts of sodium acrylate and 0.5 part by weight of ethylene glycol diacrylate, and to the 35% solution thereof, 1% of the sodium salt of 70% hydrolyzed polyacrylonitrile was added. Conversion to polymer of 67% was obtained. A 5% solution of the polymer product in water imparted a viscosity of 900 centipoises.

EXAMPLE 8

The procedure of Example 7 was followed substituting the same amount of acrylic anhydride for the ethylene glycol diacrylate. Substantially the same conversion, water viscosity and latex thickening effect were obtained.

EXAMPLE 9

The procedure of Example 7 was followed replacing the 99.5% sodium acrylate/0.5% ethylene glycol diacrylate with a 99% sodium acrylate/1% methyl acrylate mixture. Substantially the same percentage conversion and effects on viscosity in water and latex were obtained.

EXAMPLE 10

To a 35% solution of a mixture of 75 parts sodium acrylate and 25 parts by weight of acrylamide, 2% (on the weight of monomers) of ammonium persulfate was added. The resulting monomer solution was introduced into the equipment of Example 1 at a rate of 60 cc. per minute and the hot air was supplied at 600° F. Polymer conversion of 98% was obtained. The polymeric product when dissolved at the 5% level in water produced a viscosity of 490 centipoises. The addition of 1% of the polymer product to the synthetic rubber latex produced a viscosity of 4400 centipoises and the addition of 3% thereof to the latex produced a viscosity of 18,000 centipoises.

EXAMPLE 11

The procedure of Example 10 was followed except that the monomer mixture was replaced with a mixture of 90% sodium acrylate and 10% by weight of the other monomer listed in Table I.

*Table I*

| Other Monomer | Conversion, Percent | Cps./ H₂O/5% | Cps./Latex 1% | Cps./Latex 3% |
|---|---|---|---|---|
| Potassium Acrylate | 86 | 425 | 350 | 11,400 |
| Magnesium Acrylate | 93 | 690 | 200 | 16,000 |
| Methacrylamide | 57 | 15 | 50 | |
| Maleamic Acid | 72 | 30 | 150 | |
| Sodium Methacrylate | 55 | 15 | 50 | |

EXAMPLE 12

The procedure of Example 11 was followed replacing the monomer mixture with a mixture of 60 parts of sodium acrylate and 40 parts of ammonium acrylate. A conversion of 83% was obtained. A 5% solution of the polymer product in water had a viscosity of 400 centipoises and a 1% solution in the synthetic rubber latex above had a viscosity of 1500 centipoises.

A copolymer was similarly obtained from a mixture of 40 parts of sodium acrylate with 60 parts of ammonium acrylate. A conversion of 93% was obtained. The polymer product when dissolved at the 5% level in water had a viscosity of 530 centipoises. A 1% solution in the synthetic rubber latex had a viscosity of 3200 centipoises and a 3% solution in the latex had a viscosity of 12,200 centipoises.

EXAMPLE 13

The procedure of Example 11 was followed changing the monomer mixture to a ternary mixture containing sodium acrylate (NaA), acrylamide (AM), and calcium acrylate (CaA), in the proportions given in the accompanying Table II, with the results disclosed in the table.

*Table II*

| Weight Ratio, NaA:AM:CaA | Inlet, °F. | Conversion, Percent | Cps./ H₂O/5% | Cps./Latex 1% | Cps./Latex 3% |
|---|---|---|---|---|---|
| 82:9:9 | 600 | 97 | 430 | 3,100 | 15,600 |
| 75:18:7 | 600 | 92 | 375 | 3,000 | 13,800 |
| 80:5:15 | 600 | 95 | 285 | 2,000 | 10,600 |
| 70:15:15 | 600 | 89 | 310 | 2,600 | 10,000 |

EXAMPLE 14

The procedure of Example 11 was followed substituting for the monomer mixture a mixture containing 75 parts by weight of sodium acrylate, 18 parts by weight of maleamic acid and 7 parts by weight of calcium acrylate. Ninety-two percent conversion to polymer was obtained. A 5% aqueous solution of the polymer product had a viscosity of 150 centipoises. The addition of 1% of the polymer product to the latex dispersion provided a viscosity of 1000 centipoises.

EXAMPLE 15

A 35% ammonium acrylate solution containing 2% (on the monomer) of ammonium persulfate and 3% (on the monomer) of the sodium salt of a 70% hydrolyzed polyacrylonitrile was spray-polymerized by the equipment of Example 1 using hot air at a temperature of 600° F. A conversion of 98% to polymer was obtained. A 5% solution of the polymer product in water had a viscosity of 960 centipoises. Addition of 1% of the polymer to the synthetic rubber latex produced a viscosity of 4700 centipoises.

EXAMPLE 16

A 35% aqueous solution of calcium acrylate containing 2% (on the monomer) of ammonium persulfate was spray-polymerized in the equipment of Example 1 using air at a temperature of 600° F. A conversion of 95% was obtained.

EXAMPLE 17

The procedure of Example 2 was followed except that the main monomer solution consisted of an aqueous 40% solution of a mixture of 25 parts of sodium methacrylate with 75 parts by weight of acrylamide (no hydrolyzed polyacrylonitrile being used). The hot air inlet temperature was 600° F. A conversion to polymer of 79% was obtained. The polymer when dissolved in water at the 5% level produced a viscosity of 25 centipoises.

EXAMPLE 18

The procedure of Example 2 was followed substituting for the monomer solution a 35% solution of a mixture of 90 parts by weight of sodium acrylate with 10 parts by weight of dimethylaminopropyl methacrylamide (no hydrolyzed polyacrylonitrile being used). The air inlet temperature was 600° F. The polymer conversion was 73%. The polymer product when dissolved in water at the 5% level produced a viscosity of 3200 centipoises.

EXAMPLE 19

To 60 parts of water, 40 parts by weight of a mixture of 30 parts of ethyl acrylate and 70 parts of sodium acrylate were added. The ethyl acrylate was at least partially dissolved but the remainder was emulsified by the addition of 1.2 parts by weight of the sodium salt on an ethylene oxide derivative of a sulfonated octyl phenol containing an average of about 10 ethylene oxide units. As catalyst, 0.8 part of ammonium persulfate was introduced. This dispersion was fed at a rate of 70 cc. per minute into the equipment described in Example 1 and air at 600° F. was supplied at about 175 to 200 cubic feet per minute. A conversion of 60% was obtained.

EXAMPLE 20

To a 35% solution of a mixture of equal parts by weight of sodium acrylate and lithium acrylate, 2% (on the weight of monomers) of ammonium persulfate was added. The resulting monomer solution was spray-polymerized in the equipment of Example 1 by feeding the solution at a rate of 70 cc. per minute. The hot air was introduced at about 400° F. at about 175–200 cubic feet per minute. The dry, solid product obtained was equal in amount to a 100% weight recovery and 99% of it had been converted to polymer. A solution in water containing 5% of the product had a viscosity of 590 centipoises. Addition of 1% of the product to the latex imparted a viscosity of 2500 centipoises and 3% produced a viscosity of 8900 centipoises.

It is to be understood that changes and variations may be made without departing from the spirit and scope of the invention as defined in the appended claims.

We claim:

1. A process for producing a polymer comprising preparing an aqueous dispersion containing dissolved therein (A) an amount from 15% by weight up to saturation of water-soluble, solid monomeric material consisting of 5 to 100% by weight of at least one solid water-soluble salt of an acid of the formula

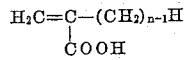

in which $n$ is an integer having a value of 1 to 2, and up to 95% by weight of other water-soluble, solid, ethylenically unsaturated monomeric material, and (B) a small proportion of a catalyst of the group consisting of ammonium persulfate and alkali metal persulfates, and spraying the dispersion into heated air having a temperature of 300° to 900° F.

2. A process as defined in claim 1 in which the dispersion contains from ½% to 3% of said catalyst, based on the weight of total monomer.

3. A process as defined in claim 1 in which the solid monomeric material comprises a mixture of water-soluble salts of acrylic acid.

4. A process as defined in claim 1 in which the solid monomeric material comprises a water-soluble salt of acrylic acid and the dispersion contains ½% to 5% by weight of another ethylenically unsaturated monomer having at least 1% solubility in water.

5. A process as defined in claim 1 in which the solid monomeric material comprises sodium acrylate and acrylamide.

6. A process as defined in claim 1 in which the solid monomeric material comprises sodium acrylate, calcium acrylate, and acrylamide.

7. A process as defined in claim 1 in which the solid monomeric material comprises sodium acrylate and the dispersion contains ½% to 5% by weight of ethylene glycol diacrylate.

8. A process as defined in claim 1 in which the solid monomeric material comprises sodium acrylate and the dispersion contains ½% to 5% by weight of methyl acrylate.

9. A process as defined in claim 1 in which the solid monomeric material comprises sodium acrylate.

10. A process as defined in claim 1 in which the solid monomeric material comprises sodium acrylate and the dispersion contains ½% to 5% by weight of N-dimethylaminopropyl methacrylamide.

11. A process as defined in claim 1 in which the monomeric salt is dissolved in one aqueous solution, the catalyst is dissolved in another, and the two solutions are fed and mixed continuously at a point just before the point of disruption into a spray.

12. A process as defined in claim 1 in which the monomer dispersion is deaerated before spraying.

13. A process as defined in claim 1 in which the solid monomer consists of a salt of acrylic acid.

14. A process as defined in claim 1 in which the dispersion also contains a small proportion of a sodium salt of a 65% to 90% hydrolyzed polyacrylonitrile in an amount not over about 3.5% by weight of total monomeric material.

15. A process as defined in claim 1 in which the dispersion also contains a small proportion of acetamide in an amount not over about 3.5% by weight of total monomeric material.

16. A process for producing a polymer comprising preparing an aqueous dispersion containing dissolved therein (A) an amount from 15% by weight up to saturation of water-soluble, solid monomeric material, consisting of 5 to 100% by weight of at least one solid monomer of the class consisting of the ammonium, alkali metal and alkaline earth metal salts of acrylic acid, methacrylic acid, and mixtures thereof and up to 95% by weight of other water-soluble, ethylenically unsaturated monomeric material, and (B) a small proportion, from ½% to 3% based on total weight of monomer, of a catalyst of the group consisting of ammonium persulfate and alkali metal persulfates, and spraying the dispersion into heated air having a temperature of 300° F. to 900° F.

References Cited in the file of this patent

UNITED STATES PATENTS

| | | |
|---|---|---|
| 2,280,802 | Depew | Apr. 28, 1942 |
| 2,289,540 | Dittmar et al. | July 14, 1942 |
| 2,595,852 | Hopper | May 6, 1952 |